United States Patent [19]

Rogers

[11] 4,415,932

[45] Nov. 15, 1983

[54] CRT MOUNTING AND IMPLOSION-PROTECTION MEANS AND METHOD

[75] Inventor: Melvin F. Rogers, Western Springs, Ill.

[73] Assignee: Zenith Radio Corporation, Glenview, Ill.

[21] Appl. No.: 380,510

[22] Filed: May 21, 1982

[51] Int. Cl.$^3$ .................... H01J 61/50; H04N 5/645

[52] U.S. Cl. .................................. 358/246; 358/248; 220/2.1 A

[58] Field of Search .............................. 358/246, 248; 220/2.1 A

[56] References Cited

U.S. PATENT DOCUMENTS

| | | | |
|---|---|---|---|
| 3,557,306 | 1/1971 | Inglis | 358/246 |
| 3,569,990 | 3/1971 | Inglis | 358/246 |
| 3,623,196 | 11/1971 | Bongenaar | 358/246 |
| 3,697,686 | 10/1972 | Hildebrants | 358/246 |
| 3,777,057 | 12/1973 | Abe | 358/246 |
| 3,890,464 | 6/1975 | Hill et al. | 358/246 |
| 4,121,257 | 10/1978 | Krishnamurthy | 358/246 |
| 4,135,211 | 1/1979 | Rogers | 358/246 |
| 4,210,935 | 6/1980 | Mitchell et al. | 358/246 |

*Primary Examiner*—Howard Britton

[57] ABSTRACT

Improved mounting and implosion-protection means and method are disclosed for use in a cathode ray tube having a substantially rectangular glass face panel with a rearwardly extending skirt. A first tension band has a predetermined relatively wide width for compressively inwardly loading the panel at a tension level completely effective to protect against implosion. Four mounting brackets, one at each corner of the panel for mounting the tube, have a rearwardly extending foot. A second tension band substantially narrower than the first band circumscribes and overlays the first band. The second band is tensioned at a level 55 to 78 percent of the tension level of the first band for capturing and compressively holding each bracket foot against the first band. The effect according to the invention is such that the tension level of the second band is effective to retain the mounting brackets, but ineffective to deleteriously interfere with the implosion protective tension exerted on the panel by the first band.

17 Claims, 4 Drawing Figures

CRT MOUNTING AND IMPLOSION-PROTECTION MEANS AND METHOD

BACKGROUND OF THE INVENTION AND PRIOR ART STATEMENT

This invention relates to television cathode ray picture tubes and is particularly directed to means and method for the mounting and implosion-protection of such tubes.

Cathode ray tubes typically have a very high vacuum within the envelope. As a result, several tons of atmospheric pressure are exerted on the envelope, primarily in the areas of face panel and funnel. If there is a weak area in the glass of the envelope such as may result from a scratch or a manufacturing defect, or if the tube receives a blow or a shock, the envelope is susceptible to implosion. (The term "implosion" is defined by Underwriters Laboratories, Incorporated as a "rapid and sudden inward bursting of a high-vacuum glass envelope.")

Several approaches have been evolved to diminish the possibility of implosion, or if an implosion occurs, to reduce its potentially violent effects. An approach presently in common use involves placing a high compressive pre-load on the envelope by means of a tension band, particularly on the skirt area of the face panel. The tension band is under a very high tensive load; for example, 1,500–2,000 pounds. By compressively pre-loading the face panel, the implosion-induced tensive stresses in the panel must first overcome the compressive pre-stresses in the panel before the panel will fracture. Problems with this method of implosion-protection include the criticality in the placement of the band; for example, a misplacement of the band of one-eighth inch may destroy its implosion protectability. Another problem stems from the fact that the primary pressure is applied at the corners of the face panel, and relatively slight pressure is applied to other parts of the periphery.

Because of their inherent strength and relative stability with respect to the envelope, tension bands have also been used for tube mounting. An L-shaped member is typically installed at each corner, with one leg of the "L" captivated by the tension band, and the other leg extending radially outwardly and having a mounting hole or slot therein for attaching the tube to the television receiver cabinet.

In U.S. Pat. No. 4,210,935, Mitchell et al. discloses an implosion-resistant cathode ray tube. A pair of untensioned half-shell rim bands are affixed on the substantially rectangular shaped face panel flange area. An L-shaped bracket member is disposed intermediate the rim bands and an encircling metal band exerts a compressive force thereon. The base portion of the bracket member is of a size and at a location such that the metal band contacts the rim band on the radius of curvature of the corners and prior to the flattened portion of the flange of the tube envelope.

Krishnamurthy in U.S. Pat. No. 4,121,257 discloses an implosion-protected cathode ray tube which has a first smooth-plastic-coated steel band laid directly on and encircling the glass panel. A second smooth-plastic-coated steel band is laid on the first band. Both bands are tensed to provide hoop compression of the glass panel of the tube. In some embodiments of the Krishnamurthy invention, there may be a lubricating overcoating over the plastic coating and/or a short length of tape under the seal on the first band. Also, the forward edge of the first band may lie over the mold match line or up to 0.300 inch forward of the mold match line of the tube. Krishnamurthy also discloses mounting lugs located at each corner between the bands.

In U.S. Pat. No. 4,135,211, Rogers discloses an implosion-protected, rectangular-type color cathode ray tube comprising a rectangular glass face plate of the type having a viewing window and a flange extending rearwardly therefrom. The bulb has a double tension band system very tightly constricting the flange so as to provide implosion protection for the bulb by compressively pre-loading the corners of the flange. The bulb is characterized by having on the outside of the face plane flange at each corner, and molded integrally with the flange, an incompressible load-concentrating boss for significantly reducing the corner area on which the load is applied by the tension bands. By this expedient, the level of the compressive stresses generated in the flange at the flange corners, and the resultant implosion protection provided by the tension band system, is stated to be greatly enhanced.

Hill et al in U.S. Pat. No. 3,890,464 discloses an impulse-resistant implosion-protection system for large screen cathode ray tubes. The system includes a strip of relatively incompressible tape secured to and encircling the cathode ray tube front panel. A first steel tension band is placed directly over the tape and tensed to provide hoop compression on the front panel. A second steel tension band is placed directly over the first band and also tensed to provide hoop compression on the front panel. The tension bands are tensed so as to provide a relatively high cumulative compression on the front panel.

In U.S. Pat. No. 3,697,686 Hildebrants discloses a glass cathode ray tube envelope provided with implosion-protection means by wrapping the peripheral portion of the envelope adjacent to the faceplate with a piece of fabric impregnated with an uncured thermosetting bonding material. A first steel band is positioned around the tape; two-thirds of the band is heated to bond the tape to the glass envelope and band along two-thirds of the periphery of the envelope. The band is tensioned and permanently mounted on the envelope by welding the ends together under tension while still hot so that, upon cooling, the band tension is increased to about 1,500 pounds. A second steel band is mounted on the first band in the same manner as the first band but with the joint on the opposite side of the envelope to bond the tape to the envelope and the first band along the remaining one-third of the periphery thereof.

OBJECTS OF THE INVENTION

It is a general object of this invention to provide for retaining mounting brackets at the corners of substantially rectangular cathode ray picture tube face panels.

It is another general object of the invention to provide for optimally compressively loading face panels to inhibit implosion.

It is a less general object of the invention to provide combination means for mounting corner brackets and for optimally compressively inwardly loading face panels for implosion-inhibiting.

It is a more specific object of the invention to provide for the mounting of brackets at face panel corners in conjunction with a tension band without concentrating panel-compressive forces on the mounting brackets.

It is a specific object of the invention to provide for mounting the brackets wherein the brackets can be located substantially off the diagonals of the face panel without affecting implosion protection.

It is yet another specific object of the invention to provide improvement in the mounting and implosion protection of cathode ray tubes of large diagonal measure and wide deflection angle.

It is yet another specific object of the invention to provide means and method for mounting an implosion protection enabling cathode ray tubes of relatively wide deflection angle to pass UL and CSA implosion-safety tests.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
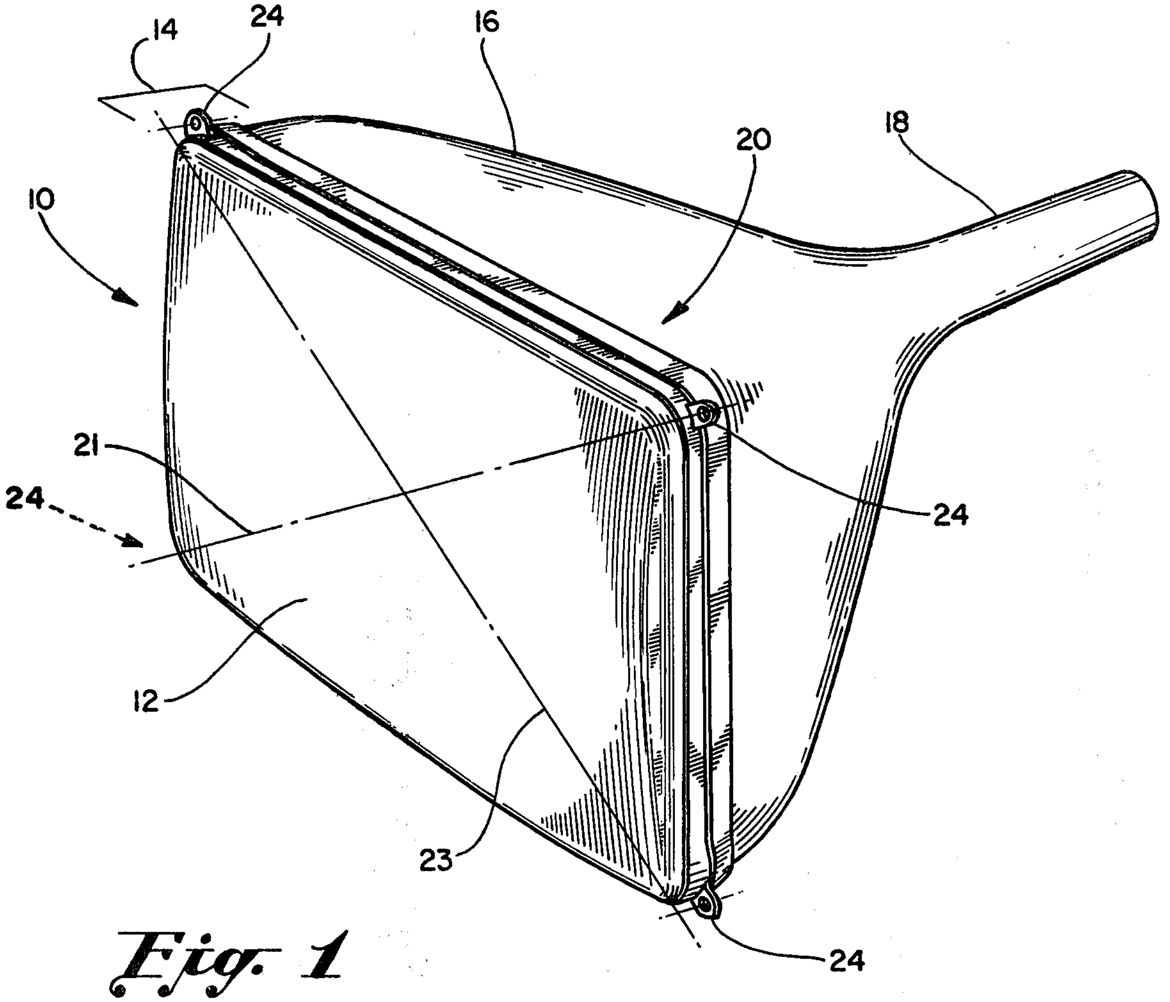
FIG. 1 is an oblique view in perspective showing the front of a cathode ray picture tube equipped with the improved mounting and implosion-protection means according to the invention.

FIGS. 1–4 show generally and in detail a preferred embodiment of the invention which is for use in a cathode ray tube 10. Tube 10 has a substantially rectangular glass face panel 12 with a rearwardly extending skirt 14, indicated by the bracket. As is well-known in the art, the face panel 12 is attached to a funnel 16 from which extends a neck 18 in alignment with the axis of tube 10. Tube 10 is depicted as having an improved mounting and implosion-protection means 20 according to the invention. Also indicated are the diagonals 21 and 23 of the substantially rectangular face panel 12.

Figure 2:
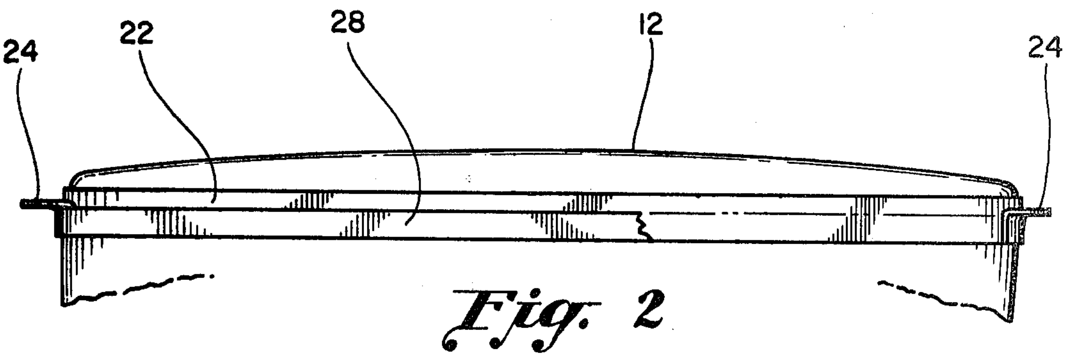
FIG. 2 is a view in elevation of a face panel assembly showing additional details of the mounting and implosion-protection means according to the invention.
Figure 3:
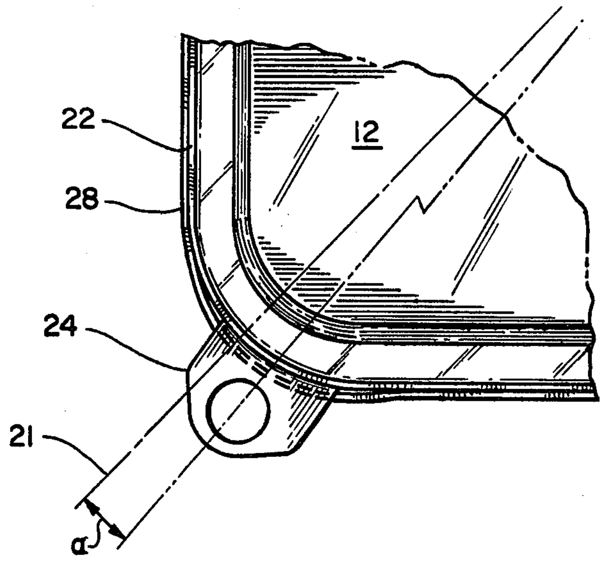
FIG. 3 is a plan view of a corner section of the face panel shown by FIG. 2 showing further details of the mounting and implosion-protection means according to the invention.
Figure 4:
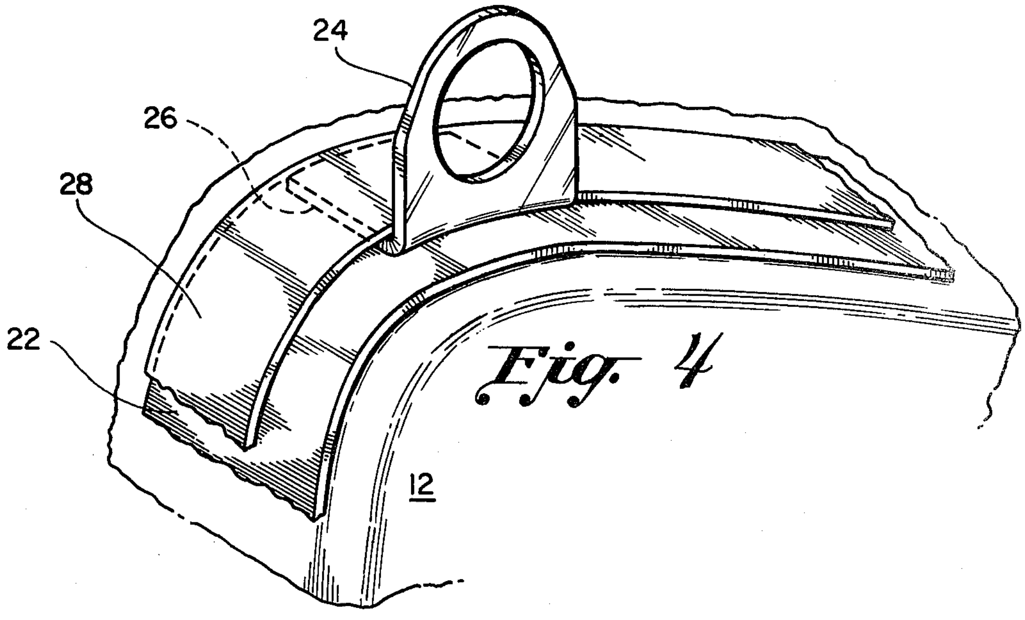
FIG. 4 is a view in perspective of a corner section of the face panel and a mounting bracket retained by the means according to the invention.

With reference now to FIGS. 2—4 which show the invention in greater detail, there is depicted a first tension band 22. First tension band 22 will be noted as having a predetermined relatively wide width; i.e., substantially greater than one inch. Band 22 provides for compressively inwardly loading panel 12 at a tension level completely effective to protect against implosion of the tube 10. The compressive implosion-protective tension provided is in the range of 1,900 to 2,200 pounds, and preferably about 2,000 pounds. Band 22 is installed and drawn to a desired tension by a standard banding and band-crimping machine well known in the art.

Four apertured mounting brackets 24, one at each corner panel 12, provide for mounting tube 10. One such bracket 24 is depicted in detail in FIG. 4, and is indicated as having a rearwardly extending foot 26; that is, a foot extending rearwardly as oriented with respect to the tube 10.

A second tension band 28, depicted as being substantially narrower; i.e., a width substantially less than one inch, will be seen as circumscribing and overlying first band 22. Second band 28 is tensioned according to the invention at a level 55 to 78 percent of the tension level of first band 22 for capturing and compressively holding each bracket foot 24 against first band 22. The mounting bracket holding tension is in the range of 1,200 to 1,400 pounds and preferably about 1,300 pounds.

The effect according to the invention is such that the tension level of second tension band 28 is effective to retain mounting brackets 24, but ineffective to deleteriously interfere with the implosion protective tension exerted on panel 12 by first band 22.

The method according to the invention for use in the mounting and implosion-protection television cathode ray tube comprises encircling the skirt 14 of the cathode ray tube 10 with a first tension band 22 having a width substantially greater than one inch and compressively inwardly loading skirt 14 with a tension level in the range of 1,800 to 2,200 pounds, and preferably about 2,000 pounds. A mounting bracket 24 is provided at each corner of face panel 12 for mounting tube 10. The brackets 24 can be located off the diagonals of the face panel 12. Each bracket is provided with a rearwardly extending foot. The first band 22 is circumscribed and overlaid with a second tension band 28 having a width substantially less than one inch. Each bracket foot is captured and compressively held against the first band 22 by the second band 28. The second band is then drawn to a tension level in the range of 1,200 to 1,400 pounds, and preferably about 1,300 pounds. The effect of the inventive method is such that the tension level of the second band 28 is effective to retain the mounting brackets 24, but ineffective to deleteriously interfere with the implosion-protective tension exerted on panel 12 by the first band 22.

The width of the first band 22 is preferably about 1.25 inch, and the width of the second band 28 is preferably about 0.75 inch. A width of second band 28 appreciably greater would deleteriously interfere with the implosion-protection provided by first band 22. The width of second band 28 is preferably about equal to the length of the foot 26 of bracket 24. The thickness of the first tension band 22 is preferably about 0.034 inch, and the thickness of the second band 28 about 0.031 inch.

Mounting brackets 24 are preferably located according to the invention off the diagonals of the rectangular face panel 12; the off-the-diagonal location does not affect the implosion-protection provided by the first tension band 22. This off-the-diagonal location, indicated in FIG. 3 by the angle $\alpha$ is made possible by the inventive innovation of providing a second tension band 28 narrower than the first tension band 22, and tensioned at a level effective to retain the mounting brackets, but ineffective to deleteriously interfere with the implosion-protective tension exerted on panel 12 by the first tension band 22. Being able to locate the mounting brackets 24 off the diagonals provides the benefit of greater latitude of location of the brackets, making possible cathode ray tube mounting configurations of greater versatility. The mounting brackets 24 may be mounted as much as ten degrees off the diagonals toward either the major or minor axes of the substantially rectangular face panel 12. It is to be noted that the mounting brackets 24 could as well be mounted directly on the diagonals, if desired.

The improved mounting and implosion-protection means and method has made it possible for tubes having very wide deflection angles; e.g., 100 degrees to 110 degrees, to pass the safety tests invoked by the Underwriters Laboratories and the CSA (Canadian Standards Association). The inventive means and method for mounting and implosion-protection are especially efficaceous when applied to cathode ray tubes at least 19 inches in diagonal measure, or greater, such as the 25-inch tube in common use.

While a particular embodiment of the invention has been shown and described, it will be obvious to those skilled in the art that changes and modifications may be made in the inventive means and method without departing from the invention in its broader aspects, and therefore, the aim of the appended claims is to cover all such changes and modifications as fall within the true spirit and scope of the invention.

I claim:

1. In a cathode ray tube having a substantially rectangular glass face panel with a rearwardly extending skirt, said tube having improved mounting and implosion-protection means comprising:

- a first tension band having a predetermined relatively wide width for compressively inwardly loading said panel at a tension level completely effective to protect against implosion;
- four mounting brackets, one at each corner of said panel for mounting said tube, each bracket having a rearwardly extending foot;
- a second tension band substantially narrower than said first band for circumscribing and overlaying said first band, and tensioned at a level 55 to 78 percent of the tension level of said first band for capturing and compressively holding each bracket foot against said first band;
- such that the tension level of said second band is effective to retain said mounting brackets, but ineffective to deleteriously interfere with the implosion protective tension exerted on said panel by said first band.

2. In a cathode ray tube having a diagonal measure of at least nineteen inches, and having a substantially rectangular glass face panel with a rearwardly extending skirt, said tube having improved mounting and implosion-protection means comprising:

- a first tension band having a predetermined relatively wide width for compressively inwardly loading said panel at a tension level completely effective to protect against implosion;
- four mounting brackets, one at each corner of said panel for mounting said tube, each bracket having a rearwardly extending foot;
- a second tension band substantially narrower than said first band for circumscribing and overlying said first band, and tensioned at a level 55 to 78 percent of the tension level of said first band for capturing and compressively holding each bracket foot against said first band;
- such that the tension level of said second band is effective to retain said mounting brackets, but ineffective to deleteriously interfere with the implosion protective tension exerted on said panel by said first band.

3. The improved mounting and implosion-protection means defined by claim 2 wherein said tension of said first band provides a compressive loading in the range of 1,800 to 2,200 pounds.

4. The improved mounting and implosion-protection means defined by claim 2 wherein said compressive holding of said second band is a mounting bracket holding tension in the range of 1,200 to 1,400 pounds.

5. The improved mounting and implosion-protection means defined by claim 2 wherein said first band provides a compressive implosion-protection tension of about 2,000 pounds, and said second band provides a mounting bracket holding tension of about 1,300 pounds.

6. The improved mounting and implosion-protection means defined by claim 2 wherein said first band is of a width substantially greater than one inch, and said second band is of a width substantially less than one inch.

7. The improved mounting and implosion-protection means defined by claim 2 wherein said mounting brackets are located off the diagonals of said face panel.

8. The improved mounting and implosion-protection means defined by claim 2 wherein the width of first tension band is about 1.25 inches, and the width of the second tension band is about 0.75 inch.

9. In a cathode ray tube having a diagonal measure of at least nineteen inches, and having a substantially rectangular glass face panel with a rearwardly extending skirt, said tube having improved mounting and implosion-protection means comprising:

- a first tension band having a width substantially greater than one inch for compressively inwardly loading said panel at a tension level in the range of 1,800 to 2,200 pounds;
- four mounting brackets, one at each corner of said panel for mounting said tube, each bracket having a rearwardly extending foot;
- a second tension band having a width substantially less than one inch circumscribing and overlying said first band and tensioned at a level in the range of 1,200 to 1,400 pounds for capturing and compressively holding each bracket foot against said first band;
- such that said tension level of said second band is effective to retain said mounting brackets, but ineffective to deleteriously interfere with the implosion-protective tension exerted on said panel by said first band.

10. The improved mounting and implosion-protection means defined by claim 9 wherein said first band provides a compressive implosion-protection tension of about 2,000 pounds, and said second band provides a mounting bracket holding tension of about 1,300 pounds.

11. A method for use in the mounting and implosion-protection of a television cathode ray tube having a rectangular glass face panel with a rearwardly extending skirt, the method comprising:

- encircling said skirt with a first tension band having a predetermined relatively wide width;
- compressively inwardly loading said skirt with a tension level completely effective to protect against implosion;
- providing a mounting bracket at each corner of said face panel for mounting said tube, and providing each bracket with a rearwardly extending foot;
- circumscribing and overlaying said first band with a substantially narrower second tension band;
- capturing and compressively holding each bracket foot against said first band by said second band;

drawing said second band to a tension level 55 to 78 percent of the tension level of said first band;

such that the tension level of said second band is effective to retain said mounting brackets, but ineffective to deleteriously interfere with the implosion-protective tension exerted on said panel by said first band.

12. The method defined by claim 11 wherein said first band is drawn to a tension providing a compressive loading in the range of 1,800 to 2,200 pounds.

13. The method according to claim 11 wherein said second band is drawn to a tension providing a mounting bracket holding tension in the range of 1,200 to 1,400 pounds.

14. The method according to claim 11 wherein the first band is drawn to a tension providing a compressive loading of about 2,000 pounds, and said second band is drawn to a bracket-foot holding tension of about 1,300 pounds.

15. The method according to claim 11 wherein a first band is provided with a width greater than one inch, and a second band is provided with a width less than one inch.

16. The method according to claim 11 wherein the first band is provided with a width of about 1.25 inches, and the second band is provided with a width of about 0.75 inch.

17. A method for use in the mounting and implosion-protection of a television cathode ray tube having a diagonal measure of at least nineteen inches, and having a rectangular glass face panel with a rearwardly extending skirt, the method comprising:

encircling said skirt with a first tension band having a width substantially greater than one inch;

compressively inwardly loading said skirt with a tension level in the range of 1,800 to 2,200 pounds;

providing a mounting bracket at each corner of said face panel for mounting said tube, and locating said brackets off the diagonals of said face panel;

providing each bracket with a rearwardly extending foot;

circumscribing and overlaying said first band with a second tension band having a width substantially less than one inch;

capturing and compressively holding each bracket foot against said first band by said second band;

drawing said second band to a tension level in the range of 1,200 to 1,400 pounds;

such that the tension level of said second band is effective to retain said mounting brackets, but ineffective to deleteriously interfere with the implosion-protective tension exerted on said panel by said first band.

* * * * *